Oct. 25, 1932.  C. C. PECK ET AL  1,884,826
ELECTRIC WELDING MECHANISM
Filed Nov. 26, 1929  7 Sheets-Sheet 1

Fig. 1

INVENTORS
Cecil C. Peck 2nd
Maurice R. Taylor.
BY
Fay, Oberlin & Fay
ATTORNEYS.

Oct. 25, 1932.  C. C. PECK ET AL  1,884,826
ELECTRIC WELDING MECHANISM
Filed Nov. 26, 1929  7 Sheets-Sheet 2

Fig. 2

INVENTORS
Cecil C. Peck and
BY Maurice R. Taylor.

Fay, Oberlin & Fay
ATTORNEYS

Oct. 25, 1932.  C. C. PECK ET AL  1,884,826
ELECTRIC WELDING MECHANISM
Filed Nov. 26, 1929   7 Sheets-Sheet 3

INVENTORS
Cecil C. Peck and
BY Maurice R. Taylor
Fay, Oberlin & Fay
ATTORNEYS

Oct. 25, 1932.  C. C. PECK ET AL  1,884,826
ELECTRIC WELDING MECHANISM
Filed Nov. 26, 1929  7 Sheets-Sheet 6

INVENTORS
Cecil C. Peck and
BY Maurice R. Taylor
Fay, Oberlin & Fay
ATTORNEYS

Oct. 25, 1932.     C. C. PECK ET AL     1,884,826
ELECTRIC WELDING MECHANISM
Filed Nov. 26, 1929     7 Sheets-Sheet 7

INVENTORS
Cecil C. Peck and
BY Maurice R. Taylor
Fay, Oberlin & Fay
ATTORNEYS

Patented Oct. 25, 1932

1,884,826

UNITED STATES PATENT OFFICE

CECIL C. PECK, OF LAKEWOOD, AND MAURICE R. TAYLOR, OF EAST CLEVELAND, OHIO, ASSIGNORS TO THE LINCOLN ELECTRIC COMPANY, OF CLEVELAND, OHIO, A CORPORATION OF OHIO

ELECTRIC WELDING MECHANISM

Application filed November 26, 1929. Serial No. 409,849.

This invention, relating as indicated to electric welding mechanism, has specific reference to a mechanism by which the welding operation is actually performed, as well as a structure adapted to be employed in the welding of longitudinal seams on relatively large objects, which structure is particularly adapted to be used in connection with the herein described welding mechanism.

In the manufacture of steel pipe of relatively large diameter it is desirable, from the standpoint of ultimate cost as well as the strength of the finished product, that the longitudinal seam necessarily incident to the forming of such pipe from a substantially flat blank, be welded rather than riveted as heretofore has been the common practice. The type of joint comprising this seam, whether it be a lap joint or a butt joint, can be formed with the mechanism comprising our invention much more readily and much more uniformly than any method now in use. The present method of welding the longitudinal seam of relatively large steel pipes or like large objects, whether such objects be in the form of a cylinder or in the form of a flat plane, is usually accomplished by the welding operator carrying a portable electrode which he manually controls and moves along the seam to be welded. The obvious disadvantages of this type of welding is that a welded seam of substantial uniformity is practically impossible. The manual control of the welding electrode as held by the hand of the operator is much inferior to the control of the welding electrode which is made possible by the mechanism comprising our invention.

It is therefore an object of our invention to provide an electric welding mechanism and a structure by which such mechanism may be advantageously employed to accomplish the welding of substantially longitudinal seams with greater uniformity and despatch than heretofore has been possible, as well as to provide a means whereby the welding of such means may be accomplished on a production basis. Other objects of our invention will appear as the description proceeds.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 1:
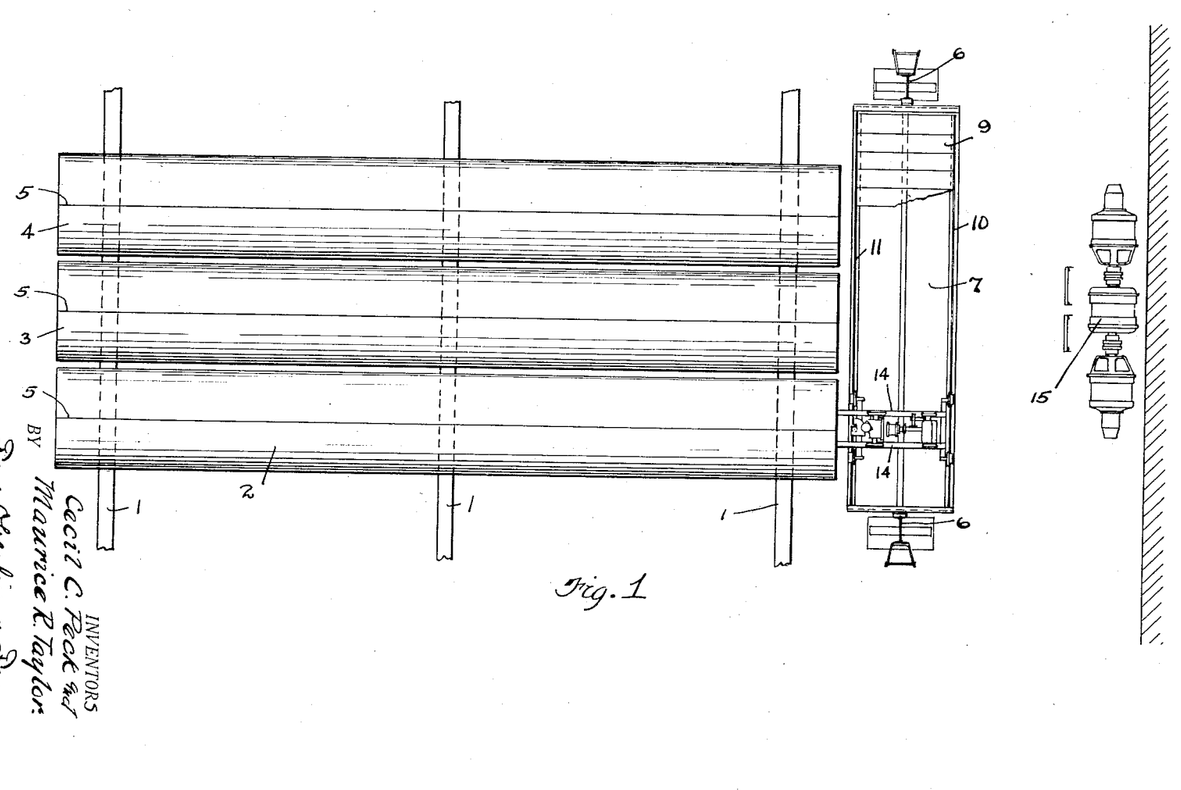
Fig. 1 is a broken plan view of a welding plant comprising our invention.
Figure 2:
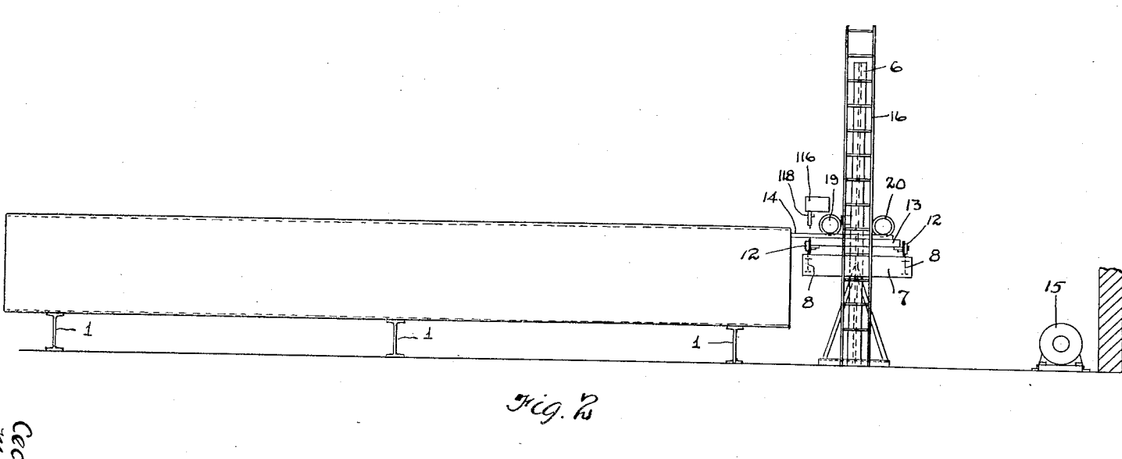
Fig. 2 is a side elevation of the plant shown in Fig. 1.

Referring more specifically to the drawings, and more especially to Figs. 1 and 2, the welding plant here illustrated consists of a plurality of sills 1 which form the bed of the welding plant and which have their upper surfaces aligned in a substantially horizontal plane and adapted to support the work to be welded, which is here shown to consist of a plurality of large steel pipes 2, 3 and 4 which lie transversely of the sills 1 and which, when in the position to be welded, have their seams 5 on the upper surface thereof.

Positioned adjacent one end of the work sustaining bed is a substantially vertical framework consisting of side standards 6 which are adapted to support the platform 7 which lies intermediately thereof and which is adjustable vertically to accommodate for various sizes of the work to be welded, which is supported on the base sills 1. The bed 7 may preferably be formed of longitudinal members 8 which carry planking 9, this planking affording a platform for the welding mechanism operator. The planking 9 in turn carries tracks 10 and 11 which are suitably spaced apart to sustain the wheels 12 of a carriage 13 supported thereby. The carriage 13 has a trackway 14 which extends laterally therefrom and which is adapted to carry a tractor welder from the carriage 13 to the work to be welded.

In Fig. 1 there is diagrammatically illustrated a welding machine 15 which supplies the welding current to the welding mechanism which travels over the work, and this welding machine may be positioned at some point so as not to interfere with the ready access of the welding plant as described. It will be noted in this connection that no electric leads are shown in the drawings, these being omitted to more clearly show the novel features of the construction, and it will be further understood that such leads may be carried from the welding machine 15 to the tractor welder in the manner which is well known to those acquainted with the art. For ascending to the platform 7 a ladder 16 is provided on one side of the vertical standards which affords an easy means for the operator of the welding mechanism to ascend to the platform, and from this point to pass to the upper surfaces of the articles to be welded should the operation demand.

Figure 3:
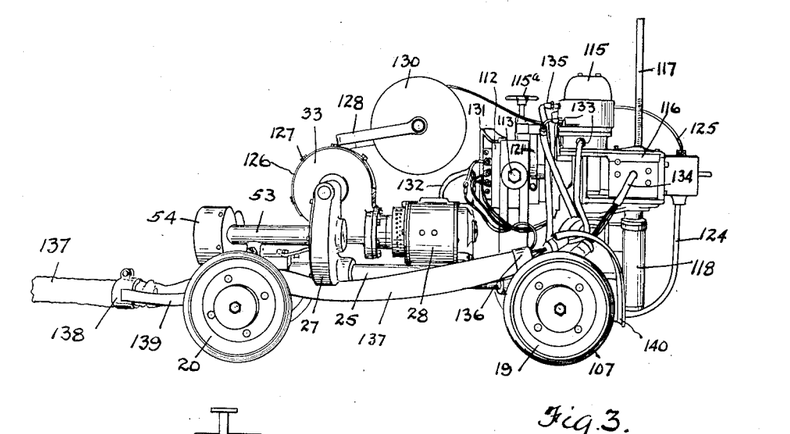
Fig. 3 is a perspective view of the electric welding mechanism used in connection with the plant shown in Figs. 1 and 2.
Figure 4:
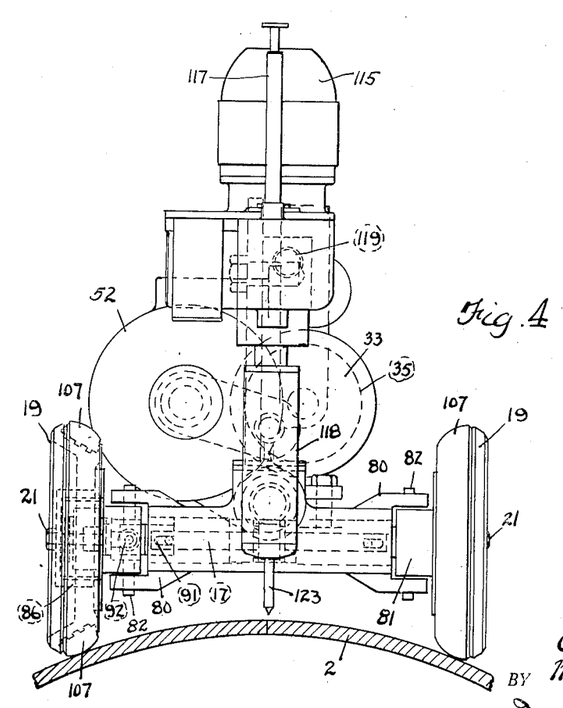
Fig. 4 is an end elevation of the mechanism shown in Fig. 3.
Figure 5:
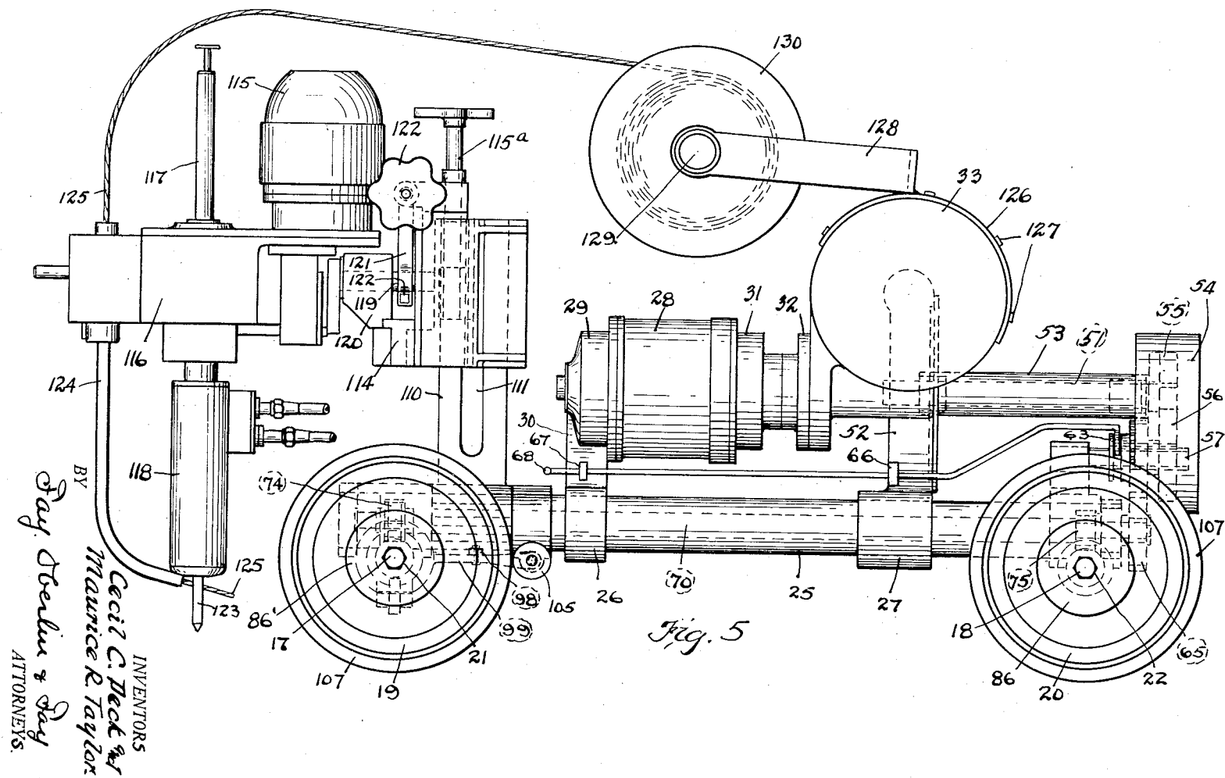
Fig. 5 is a side elevation of the mechanism shown in Fig. 3.
Figure 6:
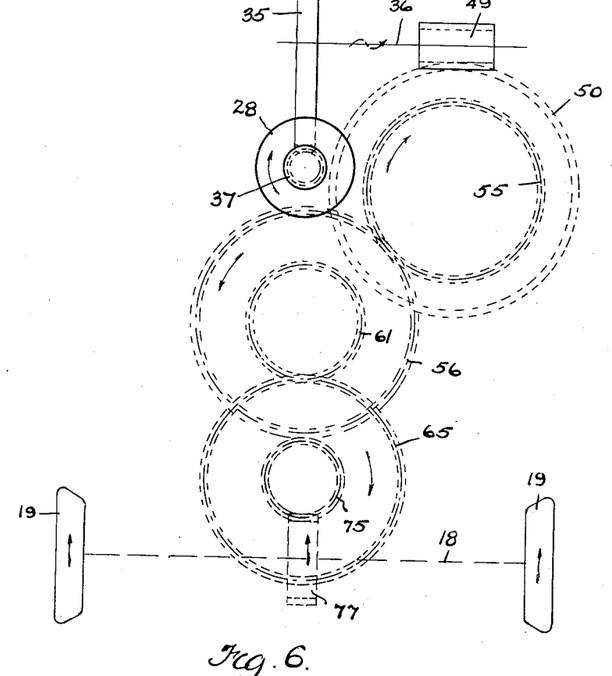
Fig. 6 is a diagrammatic representation of the gear train comprising the driving mechanism of the welder.
Figure 7:
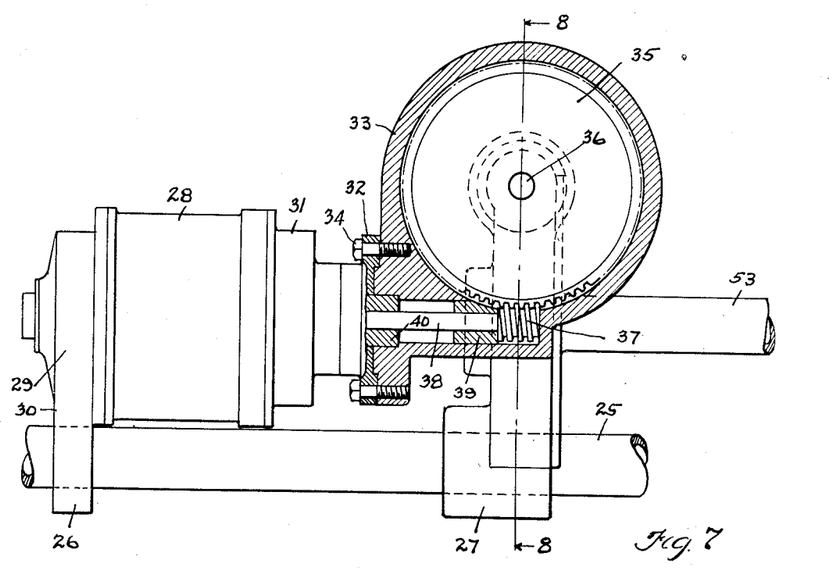
Fig. 7 is a fragmentary part section part elevation of a portion of the mechanism shown in Fig. 3.
Figure 8:
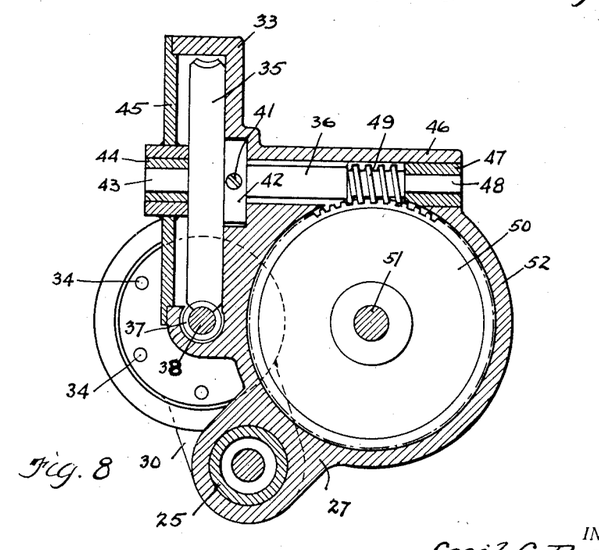
Fig. 8 is a section taken on the plane substantially indicated by the line 8—8 in Fig. 7.
Figure 9:
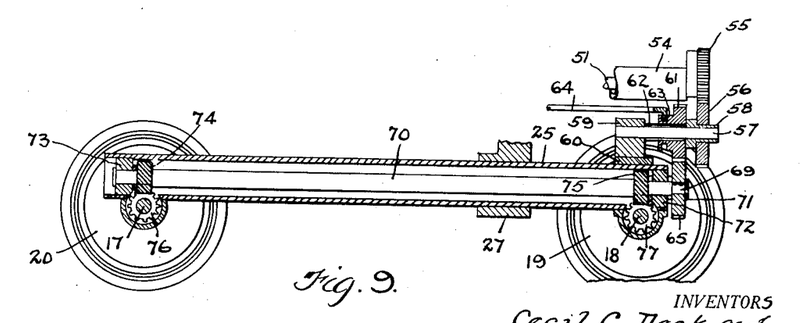
Fig. 9 is a fragmentary part section part elevation of the front and rear axles of the welder and associated driving mechanism.

The construction and operation of the tractor welder as illustrated in Fig. 3 will now be described. With particular reference first to Fig. 5, the tractor welder consists of a front axle 17 and a rear axle 18, upon which are mounted paired wheels 19 and 20, which are secured thereto by means of the bolts 21 and 22, respectively. The front axle 17 is suitably enclosed by a housing 23 and the rear axle 18 is likewise provided with a housing 24. The housings 23 and 24 are rigidly interconnected by means of a tubular member 25 on which is mounted the operating mechanism of the welder. Intermediately of the front and rear axles, the tubular member 25 carries brackets 26 and 27, by means of which the motor and its associated parts is supported. The motor 28 is shown supported at the rear end thereof by means of the end member 29 being formed integrally with the projecting portions 30 of the bracket 26. The other end member 31 of the motor 28 has in communication therewith the circumferentially flanged member 32 which is secured to the gear housing 33 by means of the bolts 34 and in this manner provides a support for this end of the motor 28. The gear housing 33 encases the worm gear 35 which is rigidly mounted on the shaft 36 and which is in driving communication with the worm 37 mounted on the motor shaft 38. The motor shaft 38 is suitably journaled in the bearings 39 and 40 which maintain the worm 37 in positive alignment with the gear 35. The shaft 36, as shown in Fig. 8, has the gear 35 rigidly and removably secured thereto by means of the set screw 41 which passes through the collar 42 forming part of the hub of the gear 35. The terminal portion 43 of the shaft 36 is journaled in the bushing 44 carried by the end plate 45 of the gear housing 33. The gear housing 33 has a part 46 formed integrally therewith and extending laterally therefrom which secures the bushing 47, by means of which the terminal portion 48 of the shaft 36 is revolubly supported. The shaft 36 has secured thereto a worm 49 which is adapted to intermesh with the gear 50 which is secured to the shaft 51. The gear 50 is encased by the casing 52, which is integrally united with the bracket 27 secured to the tubular member 25. The casing 52 has a tubular member 53 extending laterally therefrom, through which the shaft 51 passes, and this tubular member 53 is united at its other end with the gear casing 54. The gear casing 54 surrounds the gear 55 which is rigidly secured to the end of the shaft 51. The gear 55 intermeshes with a gear 56 which is in turn rigidly supported on the shaft 57 by means of the hub 58, the shaft 57 being journaled in a bearing block 59 supported on the tubular member 25 by means of the bracket 60. Coaxially mounted with the gear 56 on the shaft 57 is a driving pinion 61 which is capable of axial movement on the shaft 57, but which is revolubly restrained thereto by means of the key 62. The driving pinion 61 has a hub 63 adapted to revolubly engage the shifter lever 64, by means of which the driving pinion 61 may be brought into driving communication with the driven gear 65. The shifter lever 64, as shown in Fig. 5, may have suitable lugs 66 and 67 on the brackets 27 and 26 and may have a handle 68 formed on one end thereof to facilitate the operation of the shifter lever 64 to actuate the driving pinion 61. The driven gear 65 is rigidly secured to the terminal portion 69 of the shaft 70 by means of retaining nut 71. The shaft 70 is journaled in the bearings 72 and 73, which are supported by the terminal portions of the tubular member 25. The shaft 70 has pinions 74 and 75 rigidly secured thereto which intermesh with the gears 76 and 77, which are respectively mounted on the front axle 17 and the rear axle 18.

Figure 10:
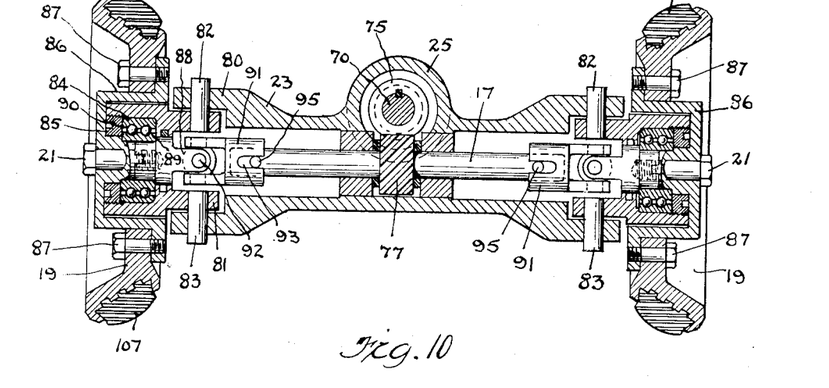
Fig. 10 is a sectional view of the front axle of the welder.

The front axle 17 of the mechanism, as most clearly shown in Fig. 10, is surrounded by the housing 23 which is secured to the end of the tubular member 25. The axle housing 23 has its terminal portions 80 enlarged to receive the members 81 which are movably secured thereto by means of the pins 82 and 83. The member 81 is adapted to receive the frictionless bearing cup 84 which is rigidly secured thereto by means of the screw ring 85. Surrounding a portion of the member 81 is the flanged hub 86, to which the wheel 19 is secured by means of the bolts 87. The central portion of the hub member 86 is adapted to receive the screw 21, by which this hub member is rigidly secured to the member 88. The member 88 supports the bearing member 89, which supports the bearing cup 84 through the frictionless rollers 90. The member 88 is pivotally secured to the sleeve 91 by means of the trunnion 92. The sleeve 91 is adapted to receive the terminal portion of the axle 17 and has a longitudinal slot 93 formed therein which receives the pin 95 rigidly secured to the shaft 17.

Figure 12:
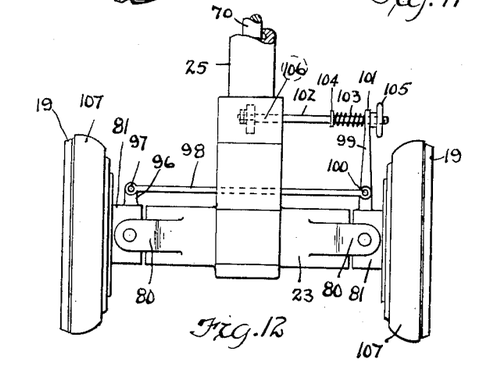
Fig. 12 is a fragmentary plan view of the front axle of the welder.

The wheels 19 of the front axle are therefore movable in order to effect a steering of the front end of the tractor welder to maintain proper alignment between the welding mechanism and the seam which it traverses. The means by which the movement of the wheels 19 may be accomplished is illustrated in Fig. 12. Secured to one of the members 81 is a lug 96 adapted to receive a pin 97, by means of which the rod 98 is oscillatorily secured thereto. The member 81 of the opposite wheel of the front axle has a member 99 rigidly united therewith and extending therefrom which is adapted to secure the pin 100, by means of which the other end of the rod 98 is oscillatorily secured thereto. The terminal portion 101 of the member 99 is adapted to receive the rod 102. The rod 102 has coaxially mounted therewith a spring 103 which bears at one end against the collar 104 and its other end against the terminal portion 101 of the member 99. The rod 102 has an adjusting hand screw 105 threadedly secured thereto and the other end of the rod 102 is more or less rigidly united at 106 to a depending ear of the tubular member 25. By axially moving the adjusting nut 105 on the rod 102 the member 99 can be caused to rotate and the wheels 19 of the front axle consequently moved to effect a steering of the apparatus.

Figure 11:
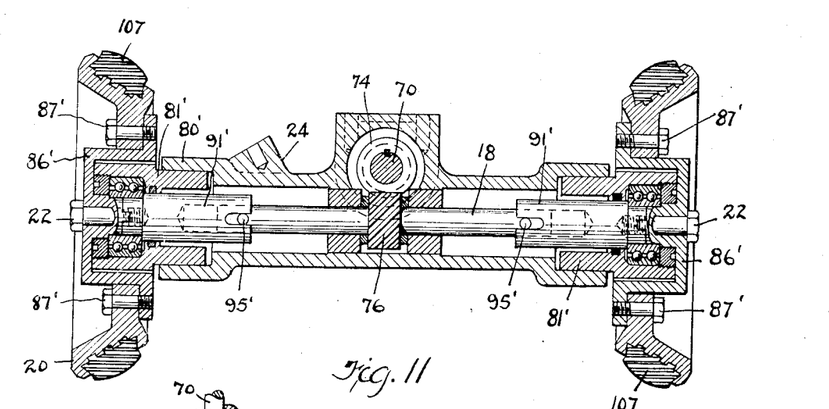
Fig. 11 is a sectional view of the rear axle of the welder.

The construction of the rear axle of the welding mechanism is similar to the construction of the front axle thereof with the exception that no means is provided for steering the wheels carried by this axle, and consequently the ordinals employed to designate the various parts of the front axle mechanism will be given prime marks to designate similar parts in the rear axle construction. It will be noted in connection with the rear axle construction that the sleeve 91' is continuous and receives the screw 22, by means of which the wheels 20 are secured thereto without the intermediary of a trunnion member. It will also be noted that the member 81' is here shown as rigidly secured to the enlarged portion 80' of the axle housing 24, this being possible since no means need be provided for movement of the member 81 with respect to the housing 24. The wheels 19 and 20 of the tractor welder may have their peripheries formed with a resilient friction material 107, which may be of rubber or like material, and which provides an insurance against any slippage of the wheels with respect to the work on which they travel, as well as providing a resilient mounting for the entire mechanism, thereby relieving the mechanism from all shock as the wheels pass over the imperfections in the surface of the work to be welded. It will also be noted that the peripheries of the wheels 19 and 20 may be formed at an angle to the axis thereof to permit such wheels to more securely bear against the outer surface of the cylindrical objects along which the tractor welding mechanism is propelled. It will be noted that the wheels 19 and 20 are so constructed that they may be applied to the mechanism oppositely from the manner illustrated in Figs. 10 and 11, and when so oppositely applied the welding mechanism will be adapted to travel on the inner surface of the cylindrical article to be welded.

Positioned on the tubular member 25 and rigidly secured thereto is a standard 110 which is provided with a longitudinal slot 111 and which supports the welding electrode holder mechanism. The standard 110 has movably mounted thereon a block 112 which is secured thereto by means of the bolt 113 which passes through the slot 111, and by means of which vertical adjustment of the entire welding electrode holder mechanism may be effected. The block 112 slidably engages the supporting member 114, which may be moved vertically by the hand adjusting screw 115ª, whereby very accurate adjustment of the electrode holding mechanism may be effected. The electrode holding mechanism, comprising a motor 115, a differential gear head 116, an electrode-containing member 117, and an electronic tornado unit 118 form the subject matter of a co-pending application, Serial No. 294,438, filed July 21, 1928, and does not form a part of this invention. The aforesaid mentioned parts constituting the welding electrode holder are mounted on the shaft 119, which is journaled in the block 120 and the slide head 114. Rigidly secured to the shaft 119 is a lever 121 which is held in place by means of the screw 122 and which is oscillatorily controlled at its upper portion by means of the horizontally extending manually operable adjustment screw 122. By moving the adjustment screw 122 the electrode holding mechanism will be caused to rotate and the electrode 123, which is held thereby, will describe an arc transversely of the welding seam. The adjusting screw 122, therefore, provides a ready means of maintaining the electrode 123 in proper lateral relation to the seam to be welded.

The welding electrode holding mechanism has associated therewith a tubular member 124, by means of which the combustible material 125 is fed to the arc area to accomplish the results outlined in the above mentioned co-pending application. The gear housing 33 has secured thereto a bracket 126 by means of the bolts 127, which bracket has a supporting arm 128 extending therefrom, the terminal portion of which is adapted to maintain the shaft 129, which carries the spool 130, upon which the combustible material 125 is wound.

The motor 28 is in electrical communication with the motor 115 through the switch box 131, whereby the current to the motor 28 may be regulated to depend upon the current flowing in the motor 115 if such connection should be found desirable. The electric leads 132 to the motor 28, the leads 133 for the motor 115, the leads 134 for the welding electrode holding mechanism, as well as the water supply conduits 135, are all brought together through the collar 136 and from there led away from the machine through the flexible conduit 137 which, to the rear of the tractor, is secured by the collar 138, which is in turn supported by the bracket members 139 which are secured to the rear of the axle of the tractor mechanism. The flexible conduit 137, after leaving the collar 138, will be of sufficient length so that the conduits contained therein will in no way hinder the operation of the tractor in its passage over the work to be welded. When the tractor has passed over the entire length of the seam to be welded, as illustrated in Fig. 1, the tractor may be brought back to the carriage by simply pulling on the flexible lead 137.

Secured to the front axle of the tractor are wheel shields 140, shown in Fig. 3, which protect the wheels 19, and especially the resilient tread 107 thereof, from the heat of the welding arc and thereby materially lengthen the working life of these parts.

The operation of the device will now be briefly described. Turning to Figs. 1 and 2, the pipes or other articles which are to be welded are rolled onto the sills 1 and suitably blocked in place so that the seams thereof will lie in the upper surface, and then the platform 7 is raised or lowered so that the members 14 will provide a continuous runway for the tractor welder to pass from the carriage on to the work to be welded. In this connection it will be seen that the lateral movement of the carriage 13 permits the tractor to be positioned opposite the end of any one of the pipes on the bed, making it possible for the welding process to be carried on continuously without interruption for bringing a new pipe into position to be welded. After the tractor has been brought to the position where the electrode 123 is directly over the end of the seam of the pipe to be welded the welding machine 15 is put into operation and the welding arc struck between the welding electrode 123 and the work to be welded. If the motor 115, which is in electrical communication with the welding current, is also placed in communication with the motor 18 it may be desirable to keep the tractor stationary for a short period of time immediately following the striking of the welding arc so that the metal in the end of the seam may be brought up to the proper temperature and a good flow of the metal in the seam started before the tractor proceeds along the work. If it should be desirable to so halt the tractor, or if at any time during the welding process, it may become necessary to momentarily discontinue the travel of the tractor along the seam, this may readily be effected by means of the rod 64 being moved axially to disengage the driving pinion 61 from the driven gear 65. As the tractor proceeds along the seam to be welded it may be necessary from time to time for the operator to make slight adjustments to maintain the welding electrode 123 in proper relation to the seam to be welded. The mechanism contained in the differential gear head 116 will automatically maintain the arc to a predetermined length, but any lateral adjustments of the electrode 123 with respect to the seam will be effected by either adjusting the screw 122 in the manner hereinbefore explained or by bodily steering the front wheels of the tractor by means of the screw 105.

It will be seen from an examination of the above described structure and welding mechanism that longitudinal seams in relatively large objects can be welded expeditiously, efficiently, and the work performed on a production basis. A further description of the various elements comprising our invention is deemed unnecessary for those acquainted with the art. Suffice it to say that a number of constructions here outlined are shown more or less diagrammatically, and a departure from the actual illustrated method may be had without departing from the principles of our invention.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In combination, a bed upon which articles to be welded are supported; a self-propelled welding apparatus supported by and traveling directly upon the articles to be welded; and vertically and transversely movable means adjacent said bed for conveying said welding mechanism from one such article to another.

2. In combination, a bed upon which articles to be welded are supported; a vertically adjustable runway extending transversely of said bed; a carriage on said runway; and a self-propelled welding apparatus supported by said carriage, said welding apparatus supported by and traveling directly upon the work during the welding operation.

3. In combination, a bed upon which the articles to be welded are supported; a vertically adjustable track extending transversely of said bed adjacent one end thereof, a carriage supported upon said track; a self-propelled welding apparatus supported by said carriage, said apparatus supported by and traveling directly upon the work to be welded; and means for supporting said welding apparatus as it passes from said carriage to the selected article to be welded.

Signed by us this 25th day of November, 1929.

CECIL C. PECK.
MAURICE R. TAYLOR.